United States Patent [19]
Jones

[11] 3,951,279
[45] Apr. 20, 1976

[54] TRUCK MOUNTED EXTENDABLE FLEXIBLE CONVEYOR

[76] Inventor: Robert E. Jones, 1994 Hilldale Drive, La Canada, Calif. 91011

[22] Filed: Apr. 17, 1975

[21] Appl. No.: 568,937

[52] U.S. Cl. ............................... 214/83.26; 214/84; 193/35 F
[51] Int. Cl.² .......................................... B60P 1/52
[58] Field of Search ........... 214/83.26, 84, 85, 85.1; 296/57 A, 61; 193/35 R, 35 TE, 35 F, 35 MD

[56] References Cited
UNITED STATES PATENTS

| | | | |
|---|---|---|---|
| 514,076 | 2/1894 | Hotz | 296/57 A |
| 1,935,734 | 11/1933 | Twomley | 193/35 F |
| 2,904,196 | 9/1959 | Teixeira | 214/84 |
| 3,104,748 | 9/1963 | Schwartz | 193/35 G X |
| 3,176,334 | 4/1965 | Lovdahl | 214/85 X |
| 3,679,074 | 7/1972 | Kuehl | 214/83.26 |

*Primary Examiner*—Albert J. Makay
*Attorney, Agent, or Firm*—Robert C. Comstock

[57] ABSTRACT

A truck mounted extendable flexible conveyor for use in loading and unloading truck cargo. When the conveyor is not in use, it is collapsed and securely stored in a vertical position in a rear corner of the truck. For use the conveyor is pulled down by the driver to a horizontal position and then extended in a straight or curved direction as required. One end of the conveyor is pivotally mounted on a shaft attached to the truck, with coil spring means extending between the conveyor and a stationary mounting plate to assist in movement of the conveyor between stored and use positions.

12 Claims, 10 Drawing Figures

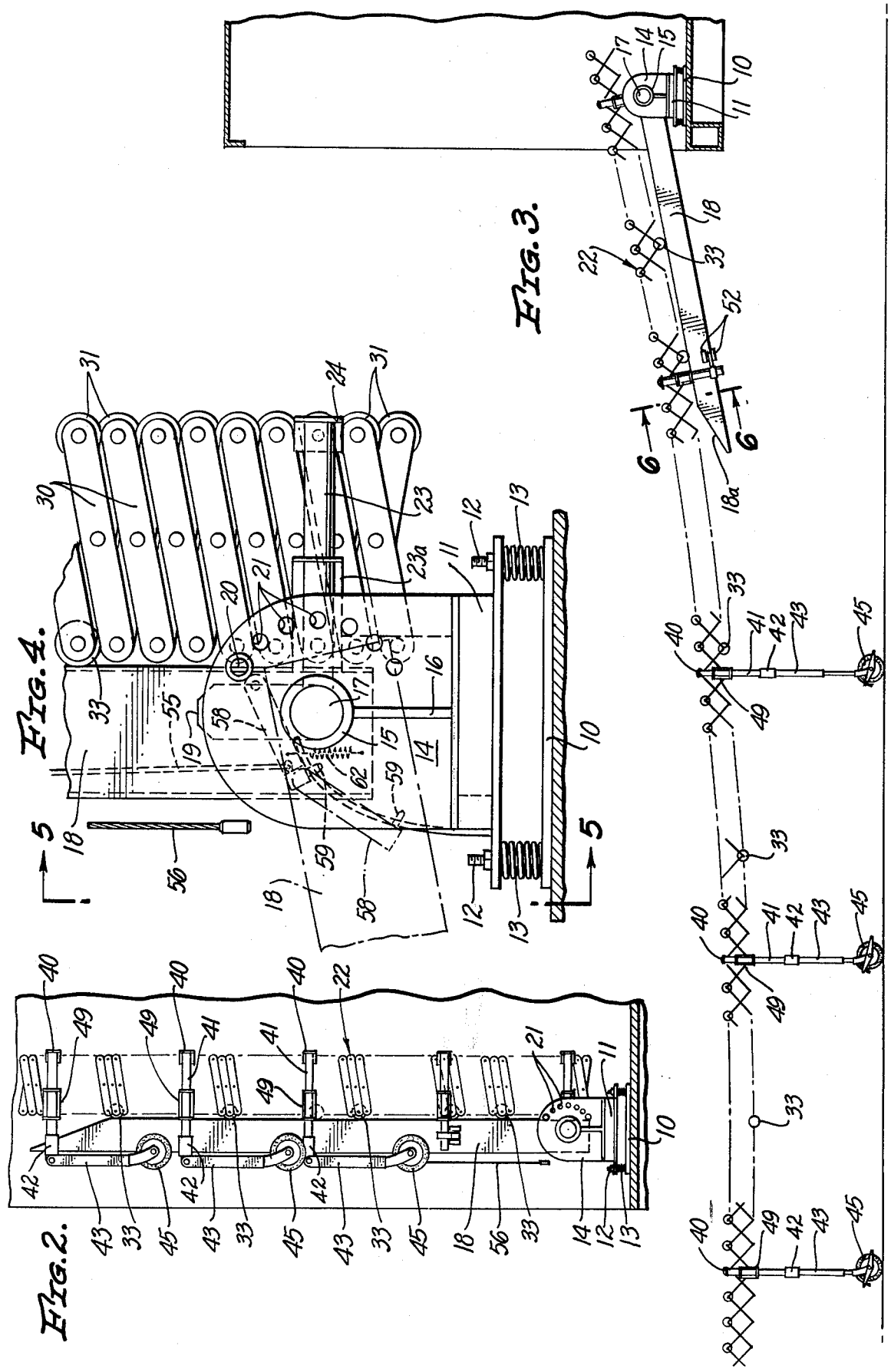

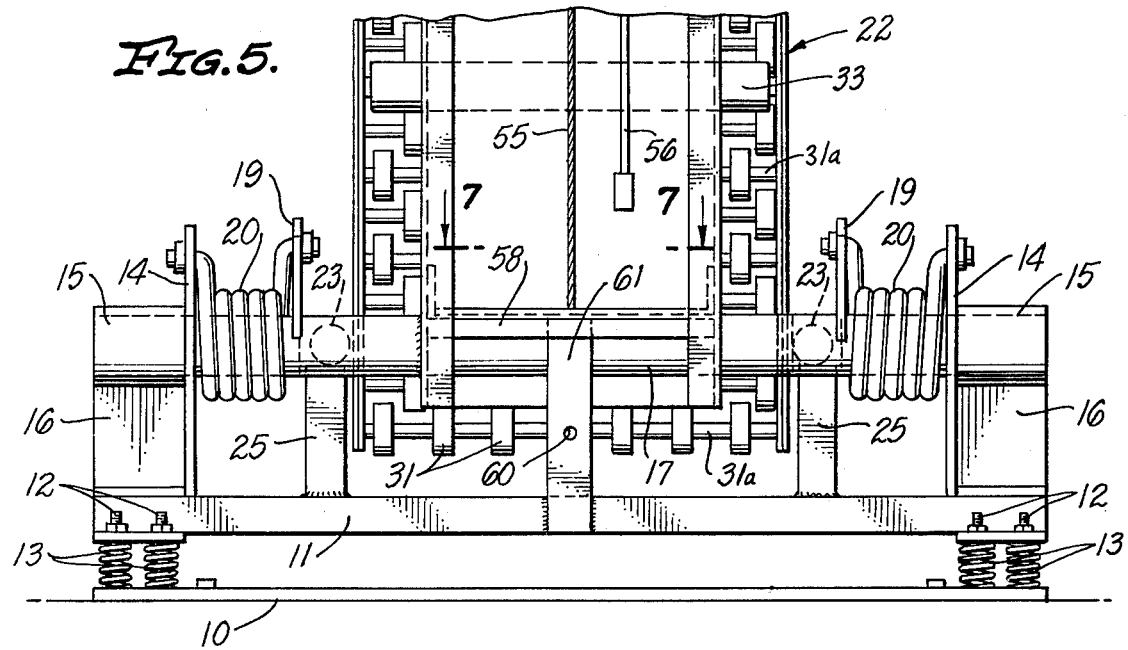
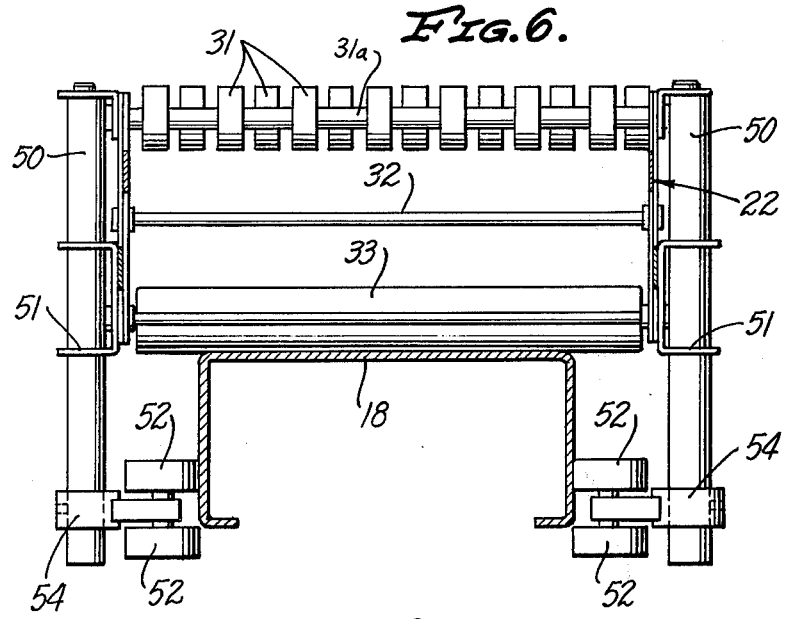
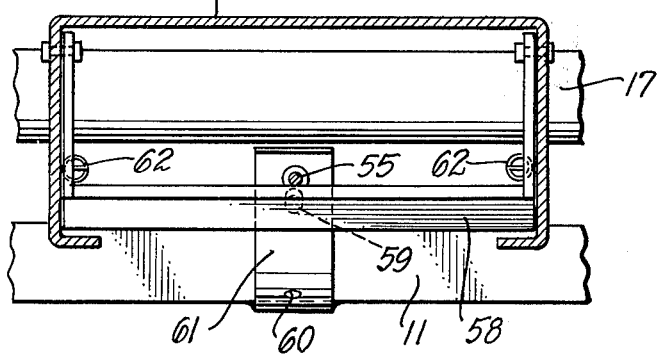
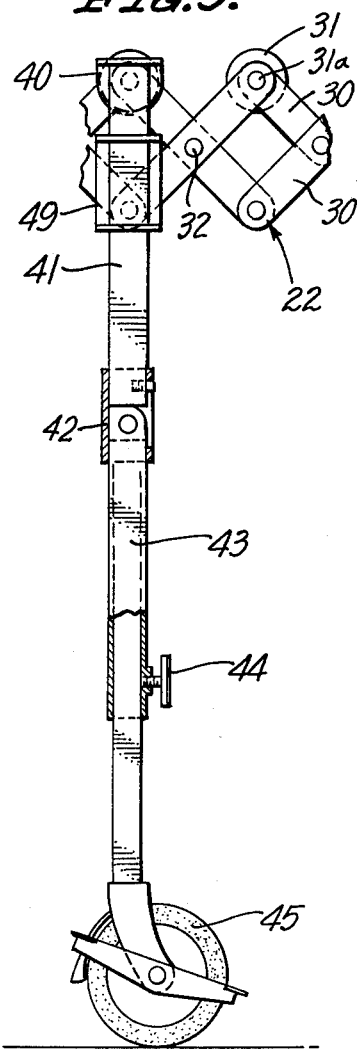

TRUCK MOUNTED EXTENDABLE FLEXIBLE CONVEYOR

BACKGROUND OF THE INVENTION

1. Field of the Invention

The invention relates to a truck mounted extendable and flexible conveyor for use in loading and unloading truck cargo.

2. Description of the Prior Art

Numerous forms of conveyors have been used in the past to facilitate the loading and unloading of truck cargo. Such conveyors have customarily been loose pieces of equipment disposed around the loading dock or carried loose within the truck. Conveyors of this type are not always readily available and are often slow and awkward to put into use. They are customarily not extendable or flexible and are not adapted to all types of loading areas or conditions.

SUMMARY OF THE INVENTION

The invention provides an extendable and flexible conveyor which is permanently and pivotally mounted in one corner of the truck. When the conveyor is not in use, it is collapsed and carried in a vertical position so that it requires only a minimum amount of space. In use, the driver can easily pull the conveyor down to a horizontal position and extend it as far as necessary in a straight or curved direction. The conveyor is spring mounted so that a minimum amount of effort is required and danger of personal injury to the driver or others is eliminated.

When the truck is ready to move, the driver alone can easily return the conveyor first to its collapsed condition and then to its vertical position within the truck. Movement of the conveyor between its stored and working positions is extremely rapid and simple and requires only a minimum amount of physical effort.

It is accordingly among the objects of the invention to provide a truck mounted conveyor having all of the advantages and benefits of the structure set forth above and described hereinafter in greater detail in this specification.

It is particularly an object of the invention to provide such a truck mounted conveyor which is safe, quick and easy to use, adaptable to loading conditions and areas, and capable of being moved between storage and working positions by the driver alone.

Another object of the invention is to provide such a device which can be manufactured and sold economically for widespread use.

The conveyor of the present invention is always available and ready for use and is adapted to save substantial labor costs by expediting cargo loading and unloading operations, particularly where a loading dock is not available. It also reduces the risk of personal injury to the driver and others and minimizes cargo loss resulting from the theft of unguarded cargo during the loading and unloading operations.

During inclement weather, the driver can minimize his exposure to the elements by loading or unloading cargo from within the truck.

The invention also comprises such other objects, advantages and capabilities as will later more fully appear and which are inherently possessed by the invention.

While I have shown in the accompanying drawings a preferred embodiment of the invention, it should be understood that the same is susceptible of modification and change without departing from the spirit of the invention.

DESCRIPTION OF THE DRAWINGS

FIG. 2 is a side elevational view of the same, taken on line 2—2 of FIG. 1;

FIG. 3 is a partial side elevational view on a reduced scale of the conveyor in use in extended position;

FIG. 4 is an enlarged view of the lower portion of FIG. 2, the side links 30 being shown spaced slightly apart from each other for purposes of illustration only;

FIG. 5 is an enlarged elevational view taken along line 5—5 of FIG. 4;

FIG. 6 is an enlarged sectional view taken along line 6—6 of FIG. 3;

FIG. 7 is a sectional view taken on line 7—7 of FIG. 5;

FIG. 9 is an enlarged elevational view partly in section of one of the legs which support the conveyor;

DESCRIPTION OF THE PREFERRED EMBODIMENT

Figure 1:
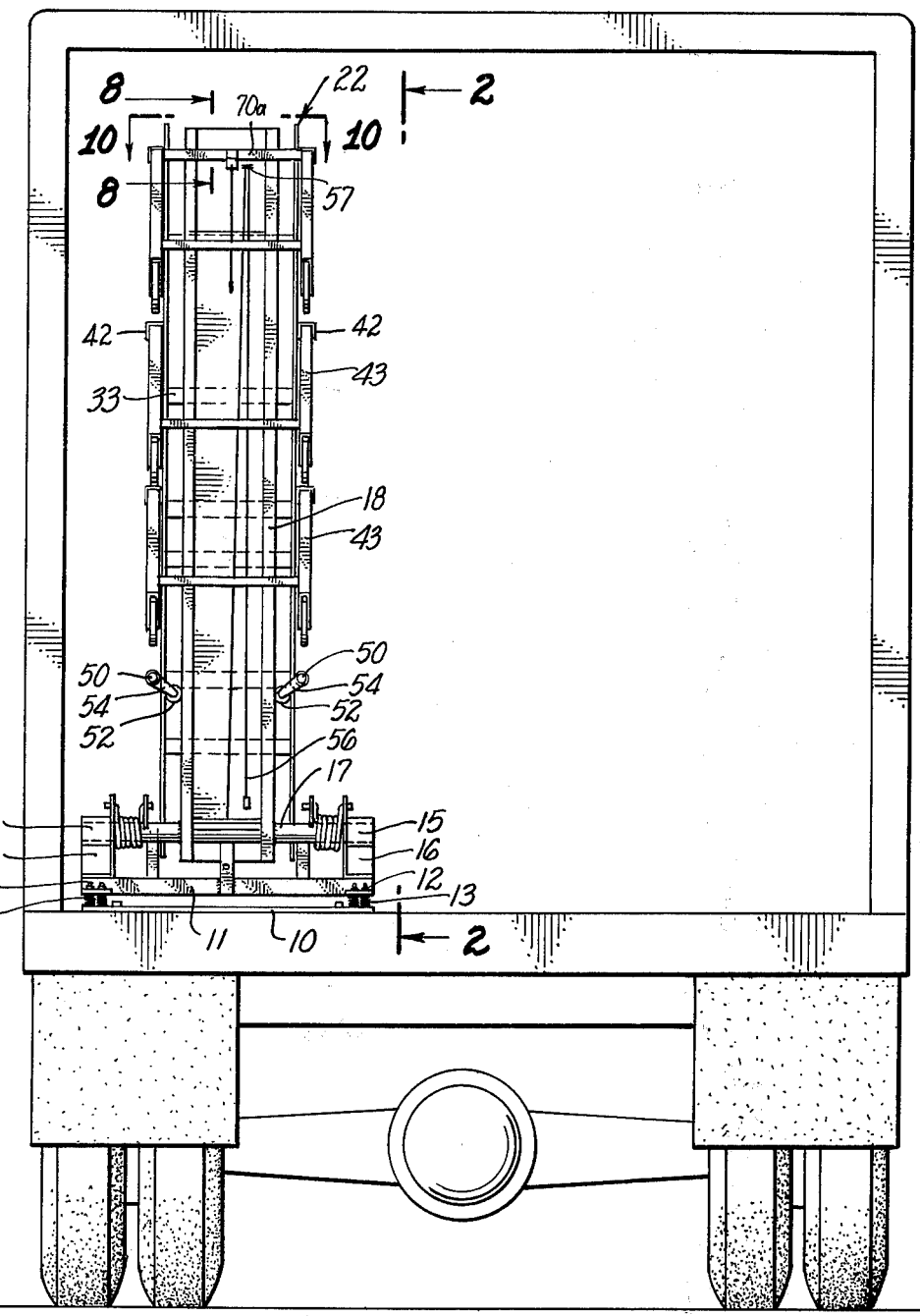
FIG. 1 is an elevational view of the conveyor in stored position within the body of a truck.

FIG. 1 of the drawings shows the conveyor of the present invention in stored position within the rear corner of a truck. The conveyor takes up only a minimum amount of floor space, the remaining area being available for carrying cargo.

The device is amounted on a base 10, which is secured to the floor of the truck. The base 10 is preferably removably attached to the truck floor by any conventional means, so that the conveyor is capable of being removed and reinstalled in the same or another truck.

As best shown in FIG. 5, a rectangular conveyor support 11 is connected to the base 10 by a plurality of fastening members 12 and is resiliently supported by a plurality of coil springs 13 which surround the midportions of the fastening members 12. The springs 13 act to cushion the support 11 and the conveyor from road shocks and vibrations when the truck is in use.

Extending vertically upwardly from adjacent the opposite ends of the conveyor support 11 are a pair of bearing plates 14. Extending outwardly from the outer side of each of the bearing plates 14 is a tubular pivot bearing 15, which is either integral with or attached to the plate 14. A vertically directed reinforcing member 16 is disposed beneath each of the bearings 15.

A pivot shaft 17 has its opposite ends rotatably journaled in the bearings 15 and its midportion welded or otherwise secured to the lower end of an elongated roller pan 18, which is shown in cross-section in FIG. 6.

Extending vertically upwardly from the pivot shaft 17 adjacent opposite sides of the roller pan 18 are a pair of spring plates 19. A pair of balance springs 20 concentrically surround the shaft 17 between the spring plates 19 and the bearing plates 14. The opposite ends of the balance springs 20 extend into openings in the plates 14 and 19 respectively. The bearing plates 14 preferably have a plurality of spring receiving openings 21 for use in adjusting the tension of the springs 20.

An extendable flexible conveyor 22 when in stored position has its lower end extending slightly below the shaft 17. A pair of conveyor mounting bars having a circular cross section are secured at one end to the shaft 17. The opposite ends of the bars 23 are connected to mounting brackets 24 which are attached to one of the side link pivot connections of the conveyor 22 adjacent to the shaft 17.

Extending vertically upwardly from the inner portion of the support 11 are a pair of stop members 25. In use, the upper ends of the stop members 25 engage one side of the mounting bars 23 to limit the pivotal movement of the conveyor 22 and hold it in stored substantially vertical position.

The conveyor 22 itself is well known to those skilled in the art. It comprises a plurality of side links 30 which are pivotally connected at their ends and midportions in a lazy tongs arrangement. Extending between the upper ends of each pair of links 30 is a shaft 31a on which a plurality of spaced rollers 31 are rotatably mounted. As best shown in FIGS. 5 and 6 of the drawings, the rollers 31 on each shaft 31a are transversely spaced alternately from the rollers 31 on the shaft 31a on opposite sides thereof. When the side links 30 are collapsed into engagement with each other, the rollers 31 are inter-spaced with each other. A plurality of spaced support bars 32 extend between the midportions of some of the links 30.

For the purposes of the present invention, there is added to the conventional conveyor structure a plurality of spaced elongated rollers 33, which are rotatably mounted on shafts secured at their opposite ends of the lower pivotal connections of spaced sets of links 30. The rollers 33 rotatably engage the upper surface of the roller pan 18 to facilitate movement of the conveyor 22 between its stored and extended positions.

As best shown in FIGS. 2 and 7 of the drawings, the conveyor 22 is provided on its opposite sides with a plurality of spaced legs. Each of the leg sections includes a top mounting bracket 40 secured to one of the upper pivotal connections of the links 22. A fixed circular shaft 41 extends from the bracket 40 slidably through a U-shaped guide bracket 49 secured to a bottom pivotal connection of the links 22. The lower end of the shaft 41 is connected to a lower mounting bracket 42 which is secured to the shaft 41 adjacent to the lower part of the roller pan 18. Pivotally attached to the lower mounting bracket 42 is a folding leg 43. The folding leg 43 comprises two telescoping portions, the upper portion being fixed and the lower portion telescoping within it for length adjustment of the legs. A lock 44 is provided to hold the leg in adjusted position. The lower end of the folding leg 43 carries a ground engaging roller 45.

As best shown in FIG. 6 of the drawings, the upper ends of a pair of side supports 50 having circular cross sections are attached at their upper ends to one of the upper link connections a short distance from the shaft 17. The side supports 50 slidably extend through a pair of U-shaped brackets 51 which are attached to one of the the truck. link connections of the conveyor 22. Attached to the lower end of each of the side supports 50 is a transverse member 54 which carries a pair of rotatably mounted guide rollers 52. The guide rollers 52 rotatably engage the opposite sides of the roller pan 18 to facilitate and guide the movement of the conveyor 22 between its stored and use position.

In order to facilitate movement of the conveyor 22 between its stored vertical position within the truck and its horizontal use position extending outwardly from the truck, a pull rope 55 may be provided for use by the truck driver. One end 56 of the rope 55 hangs loose within reach of the driver when the conveyor 22 is in stored position within truck. The pull rope 55 extends vertically upwardly from the end 56 and slidably through a ring 56 which is attached beneath the upper or outer end of the roller pan 18.

The opposite end of the pull rope 55 is connected to one end of a pivotally mounted locking member 58, which is mounted adjacent to the shaft 17. (FIG. 4) The end of the locking member 58 adjacent to which the pull rope 55 is attached carries a pin 59 which is adapted to removably extend into one of a pair of openings 60 formed in opposite ends of a curved bar 61. The lower end of the bar 61 is attached to the support 11. The opposite end of the locking member 58 comprises a fixed pivot about which the locking member 58 is rotated. A coil spring 62 urges the end of the locking member 58 which carries the pin 59 downwardly to assure its locking engagement with one of the openings 60 when the conveyor 22 is disposed in its stored and use positions.

When the rope 55 is pulled by the operator, the locking member 58 is pivoted upwardly so that the upper pin 59 is pulled out of the upper opening 60 in the curved bar 61. Further pulling movement of the rope 55 applies leverage upon the upper end of the roller pan 18 through the ring 57, causing the roller pan 18 and conveyor 22 to be pivoted downwardly on the shaft 17 against the resistance of the balance springs 20. The springs 20 should preferably counter-balance the weight of the conveyor and roller pan assembly so that it will not move downwardly too rapidly.

When the conveyor is moved to its downward position, it remains collapsed and extends horizontally outwardly and slightly downwardly from the rear end of the truck. As the conveyor moves from vertical to horizontal position, the foldable legs 43 automatically move by force of gravity to a vertical position.

Figure 8:
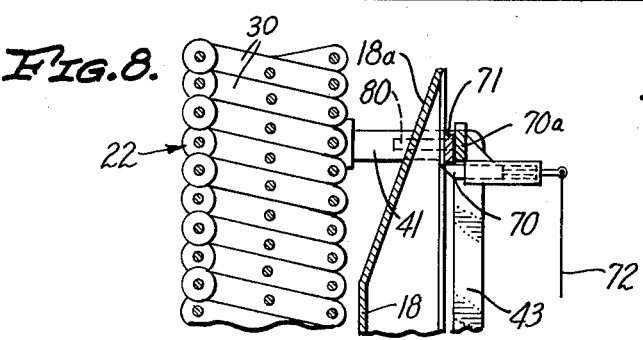
FIG. 8 is an elevational view of the locking mechanism taken along line 8—8 of FIG. 1.
Figure 10:
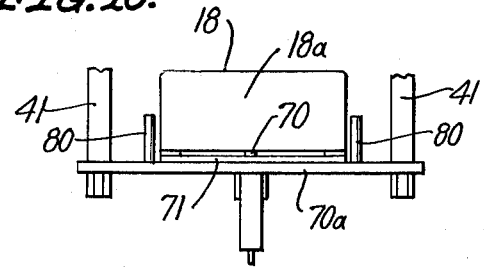
FIG. 10 is an end view taken on line 10—10 of FIG. 1.

In order to prevent undesirable movement of the conveyor from stored to extended position, a latch mechanism may be provided as shown in FIG. 8 of the drawings. A spring urged latch 70 having a tapered end engages a bar 71 which extends transversely beneath the end of the roller pan 18. The tapered end of the latch 70 permits movement of the conveyor 22 to stored position, but prevents its movement to extended position unless a pull cord 72 is operated to release the latch 70. The operating mechanism of the latch 70 is secured and extends downwardly from a crosspiece 70a which extends between the outermost pair of legs. This pull cord 72 is operated after the conveyor assembly is moved to a horizontal position in order to release the conveyor for movement to an extended position.

In order to move the conveyor 22 to extended position after the latch 70 is released, the driver pulls outwardly on the outermost pair of legs to cause the conveyor 22 to be extended in a horizontal direction. As the conveyor 22 is pulled away from the truck, the rollers 33 travel along the top of the roller pan 18 and the guide rollers 52 travel along the opposite sides of the roller pan 18. The guide rollers 52 act to space the sides of the conveyor 22 away from the roller pan 18 in order to avoid any undesirable frictional engagement between them as the conveyor 22 is moved between its collapsed and extended positions.

When the conveyor 22 is fully extended, the portion thereof which overlies the roller pan 18 extends in a straight direction, which is desirable to start the movement of containers along the conveyor from the truck. The remaining portion of the conveyor 22 beyond the outer end of the roller pan 18 can be bent or curved as desired to guide the containers to their destination. The entire conveyor 22 is extendable as to its length and the major portion thereof is flexible as to its direction.

The roller pan 18 preferably has a slanted outer end 18a as shown in FIGS. 3 and 8 of the drawings to facilitate movement of the rollers 33 on and off the roller pan 18.

When the loading or unloading movement is completed, the driver can easily and without assistance push on the outer end of the conveyor and move it horizontally into collapsed position. When the conveyor is fully collapsed, the bar 71 beneath the outer end of the roller pan 18 automatically engages the latch 70 to lock the conveyor in collapsed position.

The rope 55 is then pulled to release the pin 59 from the lower opening 60. The outer end of the conveyor assembly is then moved upwardly. With the assistance of the balance springs 20, the conveyor assembly is moved from horizontal to vertical position. As the conveyor assembly reaches its stored position, it is preferably vertical or slightly therebeyond. The pin 59 engages the upper opening 60 and the stop members 25 engage the mounting bars 23 to prevent further pivotal movement of the conveyor assembly.

Extending upwardly from the cross-piece 70a are a pair of guide pins 80, which prevent the outermost pair of legs 41 from hitting the sides of the roller pan 18 during movement of the conveyor 22 between stored and extended position.

I claim:

1. A conveyor for loading and unloading cargo onto and from the floor of the cargo carrying portion of a truck, at least the major portion of said conveyor comprising a plurality of transversely directed roller carrying members, connecting means extending between said members, said connecting means being longitudinally extendable to permit movement of said members between a collapsed storage position in which said members are disposed substantially parallel and closely adjacent to each other and a longitudinally extended usage postion in which said members are spaced a substantial longitudinal distance apart from each other, each end of said members in extended position being independently movable with respect to the other end of said member to permit limited movement of said members to angular positions with respect to each other, whereby said conveyor may be curved in either lateral direction, means pivotally mounting one end of said conveyor on said truck adjacent to said floor, and means maintaining said roller carrying members in a substantially straight line when collapsed for unitary pivotal movement of said collapsed conveyor between horizontal and vertical positions, whereby said conveyor may be stored and carried in said truck in a collapsed position extending vertically upwardly from the floor of the truck and may be pivoted downwardly to a horizontal position and then extended horizontally outwardly from the cargo carrying portion of the truck for use.

2. The structure described in claim 1, said mounting means including balance spring means for counterbalancing the weight of said conveyor during pivotal movement thereof between its vertical and horizontal positions.

3. The structure described in claim 2, one end of said conveyor being connected to a horizontally directed rotatably mounted shaft, said balance spring means comprising a pair of coil springs concentrically surrounding said shaft on opposite sides of said conveyor, said springs being connected between said conveyor and a stationary portion of said mounting means.

4. The structure described in claim 3, and a plurality of rollers extending transversely beneath said conveyor, an elongated roller pan substantially equal in length to said conveyor when said conveyor is in collapsed position, said roller pan being disposed beneath and supporting said conveyor, one end of said roller pan being connected to said pivot shaft for pivotal movement of said roller pan simultaneously with said conveyor, said elongated rollers being adapted to move longitudinally along and on and off said roller pan when said conveyor is expanded and contracted in length.

5. The structure described in claim 4, and locking means automatically operable upon movement of said conveyor to vertical position to prevent downward pivotal movement of said conveyor to horizontal position until said locking means has been released.

6. The structure described in claim 5, and a pull rope connected to said locking mechanism, said pull rope being manually operable to release said conveyor for downward pivotal movement.

7. The structure described in claim 4, and extension locking means automatically operable upon movement of said conveyor to stored position to prevent outward extension of said conveyor until said extension locking means has been released.

8. The structure described in claim 4, said connecting means comprising a plurality of side links pivotally connected together at their ends and midportions in a lazy tongs arrangement, a plurality of transversely spaced rollers mounted on each of said roller carrying members, said rollers on each of said members being alternately spaced from the rollers on the adjacent members on both sides thereof.

9. The structure described in claim 4, said conveyor having a plurality of spaced pairs of legs, said legs being collapsible so as to extend in a horizontal direction when said conveyor is in stored position and in a vertical direction when said conveyor is in use position.

10. The structure described in claim 4, said conveyor having inwardly directed roller means on opposite sides thereof directed toward and engaging the sides of said roller pan to facilitate the longitudinal movement of said conveyor with respect to said roller pan.

11. The structure described in claim 4, said mounting means including resilient means to minimize the transmission of road shock to said conveyor during use of said truck, said mounting means being removably connected to said truck.

12. The structure described in claim 1, and a plurality of rollers extending transversely beneath said conveyor, an elongated roller pan substantially equal in length to said conveyor when said conveyor is in collapsed position, said roller pan being disposed beneath and supporting said conveyor, one end of said roller pan being connected for pivotal movement of said roller pan simultaneously with said conveyor, said elongated rollers being adapted to move longitudinally along and on and off said roller pan when said conveyor is expanded and contracted in length.

* * * * *